Dec. 18, 1928.
F. H. WEBSTER
1,695,403
RIM TOOL
Filed Dec. 14, 1927
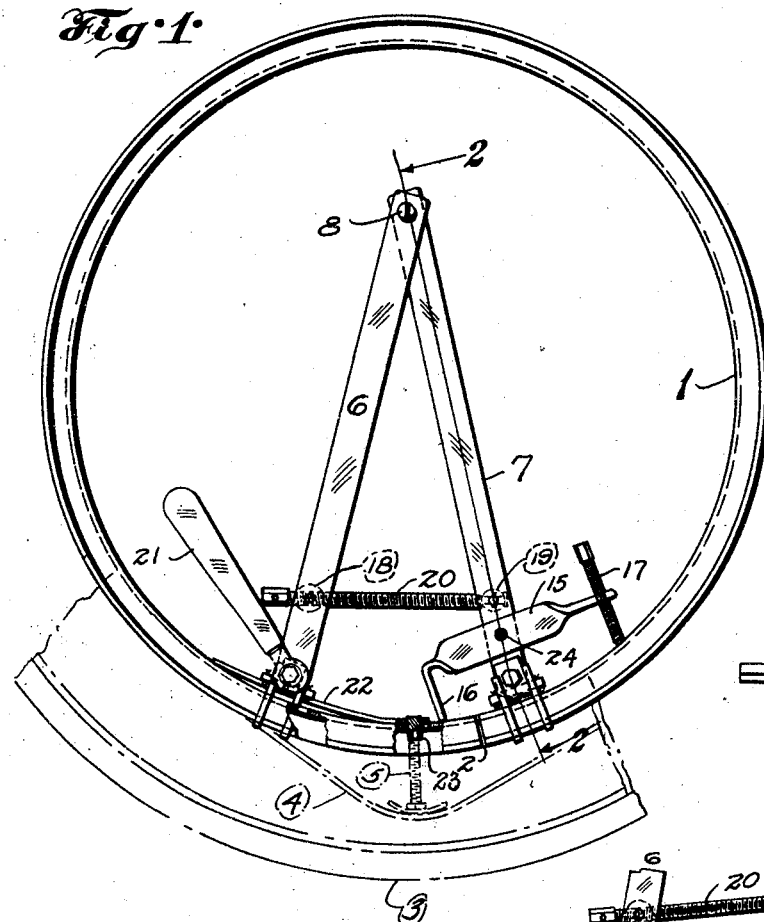
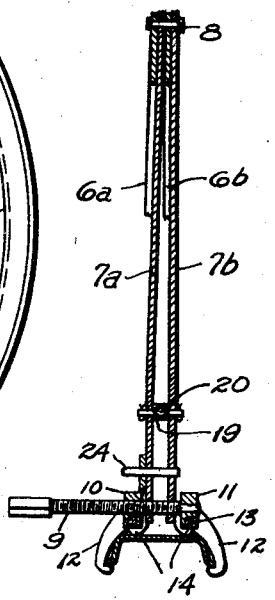
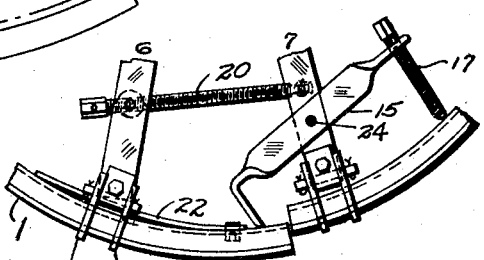
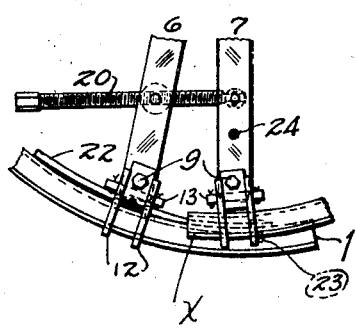
Inventor
Francis H Webster
By Cornwall, Bedell & Janus
Attorney Patented Dec. 18, 1928.

1,695,403

UNITED STATES PATENT OFFICE.

FRANCIS H. WEBSTER, OF ST. LOUIS, MISSOURI.

RIM TOOL.

Application filed December 14, 1927. Serial No. 239,928.

My invention relates to devices for breaking the joint in an automobile rim and for offsetting the ends of the rim and over-lapping them so that a tire may be easily applied or removed from the rim.

In my application Serial #222,693, filed Sept. 29, 1927, I illustrate and describe a tool for the same purpose and my present application is in part a continuation of the above mentioned application, but discloses features not shown in my earlier application.

One of the objects of my present invention is to provide means for eliminating injury to the valve stem of a tire mounted on the rim and to hold the valve stem in such position that it will not interfere with the operation of the tool.

Another object of my invention is to provide operating arms which are strong enough to resist heavy stresses, but not too clumsy to pack readily, also to mount manipulating means on such arms so that there will be no tendency to twist the arms from their normal position.

These and other detail objects of my invention are attained in the structure shown in my accompanying drawings, in which—

Figure 1 is a side elevation of a rim in its normal condition with my tool applied thereto, ready to be operated to break the rim and I indicate a tire applied to the rim.

Figure 2 is a transverse section taken approximately on the line 2—2 of Figure 1.

Figure 3 is a detail side elevation showing the joint broken.

Figure 4 is a similar elevation showing the ends of the rim over-lapped.

The rim indicated at 1 is of any ordinary type and is split as indicated at 2. A tire 3 is carried by the rim in the usual manner and includes a tube 4 having a valve stem 5.

My tool comprises two arms 6 and 7, each consisting of spaced bars, 6ª and 6ᵇ, and 7ª and 7ᵇ, respectively. At their upper ends, these bars are disposed as indicated in Figure 2, so that the bars of one arm are spaced apart by one of the bars of the other arm and all of the bars are pivotally connected by a suitable bolt 8.

The lower end of each arm 6 and 7, mounts a jaw device shown as including a screw 9 extending transversely of the arm bars and through respective blocks, 10 and 11. The screw has a thrust bearing in block 11 and is threaded into block 10 so that when rotated it can move the blocks to and from each other. Each block mounts a pair of jaws 12 by means of a pin 13. A projection 14, on the pivoted end of each jaw 12, is adapted to contact with the inner face of rim 1 to limit pivotal movement of the jaw on pin 13 in one direction. The jaws are movable independently of each other so that when the blocks are forced towards each other each jaw 12 may clamp a portion of the rim 1 independently of the other jaw and this arrangement insures a tight grip on the rim irrespective of irregularities in the rim flange.

After the jaws have been applied to the rim, the joint may be broken by means of the lever 15, detachably and pivotally mounted on arm 7 by pin 24 and having one end 16, bent downwardly to engage one end of the rim and having its other end provided with a screw 17 extending radially of the rim to engage the other end of the rim. Rotation of screw 17 to the right will force arm 7, and the portion of the rim engaged by the corresponding jaw device, upwardly and will force the other end of the rim downwardly to the position shown in Figure 3.

Arms 6 and 7 have respective blocks 18 and 19 trunnioned freely therein and a screw 20 is threaded through block 18 and has a thrust bearing in block 19. When the parts are in the position shown in Figure 3, rotation of screw 20 to the left will draw the arms 6 and 7, and the ends of the rim, to the position shown in Figure 4 in which the diameter of the rim is so reduced that the tire 3 may be easily removed.

Screws 9, 17 and 20, are provided with similarly shaped heads and a ratchet wrench 21 fitting any of these heads facilitates the rotation of the screws.

When the device is first applied to a rim, a thin strap 22, preferably of spring material, may be slipped under the lower end of bars 6ª and 6ᵇ, and a cup element 23 on one end of strap 22 may be slipped over the valve stem 5 so as to protect the threads of the latter and depress the valve to position it outside of the inner periphery of the rim which is engaged by the downturned end 16 of lever 15.

As the lower ends of arms 6 and 7 are drawn together the lower end 16 of lever 15 may ride over the end of strap 22 and the end X of the rim will move over the inner periphery of the other end of the rim.

Movement of the lever and adjacent rim end will be effected without it being necessary to manipulate the valve stem and without injury to the latter. If desired, as soon as the rim joint is broken and the ends of the rim are over-lapped to a small extent, screw 17 may be rotated to the left and lever 15 moved from arm 7 so that further movement of arm 7 towards arm 6 will not be interferred with to any extent by lever 15.

As arms 6 and 7 are drawn towards each other, the upper portions of their respective bars overlap or nest with each other. The double bearing for the pivot bolt 8 avoids any twist such as would result if a single bar were used for each arm as is illustrated in my above mentioned application. Also the pull produced by screw 20 is applied to the bars without twisting them, due to the provision of the double bars and of spaced bearings for the trunnions of each block.

The mounting of blocks 10 and 11 on the respective arms 6 and 7 by means of screw 9 is such that the blocks on one arm do not necessarily occupy the same position transversely of the rim as is occupied by the blocks on the other arm and this accommodates the interengaging arrangement of the upper portions of the bars $6^a$, $6^b$, $7^a$, and $7^b$. Sufficient play will be provided for the trunnion blocks 18 and 19 to similarly accommodate the necessary off-setting of the arm bars transversely of the rim.

It will be understood that when a tire is to be applied to the rim, the operations described above may be reversed and the rim forced to its normal position as shown in Figure 1.

It may not always be necessary to use lever 15 and screw 17 to break the rim joint and the user of the tool may be able to pivot the two arms about the lower end of arm 6 by merely pulling to the left on the upper ends of the arms. This will depend upon the strength of the user and the stiffness of the rim. When the joint can be broken by merely pulling on the arms, the lever 15 and screw 17 would only be in the way so I show the same readily detachable by being slid off of the mounting pin 24 provided on bars $7^a$ and $7^b$.

The heads of screws 9, 17, and 20 may be provided with wings adapted to be engaged by the fingers and thumb of the user and many other details of my invention may be varied without departing from the spirit thereof and I contemplate the exclusive use of all modifications which come within the scope of my claims.

I claim:

1. In a rim tool, means for overlapping the ends of a split rim, and a member controlled by said means for holding a tire valve stem outside of the rim.

2. In a rim tool, respective elements for gripping the ends of a split rim and moving them to overlap each other, and means movable along the rim relative to one of said elements and held by said latter mentioned element for positioning a tire valve stem outside of the rim.

3. In a rim tool, a member for engaging one end of a rim and including an element extending transversely of the inner face of the rim but spaced slightly therefrom, and a strap extending longitudinally of the rim through said space and having portions held by said element in contact at spaced points with said rim face, and a valve stem engaging element on one of said strap portions and adapted to project through an opening in said rim.

4. In a rim tool, respective members for gripping the ends of a rim, means drawing said members towards each other so that the rim ends overlap each other, and a member held in position by said means for holding a tire valve stem outside of the outermost rim end.

5. In a rim tool, respective members for gripping the ends of a rim, a strap associated with one of said members and extending along the rim under one end of the latter and provided with an outwardly facing cup adapted to project through an opening in the rim to engage a tire valve stem, and a lever mounted intermediate of its ends on the other of said members with one end adapted to slidingly engage the inner face of said strap or adjacent face of the rim, and means cooperating with said lever to manipulate the same to break the rim joint.

6. In a rim tool, a manipulating arm, opposed rim engaging jaw devices mounted on the end of said arm and adapted to engage opposite edges of a rim, each device having a plurality of independently movable jaws, and means for forcing the respective jaws of said devices towards each other.

7. In a rim tool, a manipulating arm, a screw element extending transversely through said arm, spaced members carried by said element, one of said members having a rotatable thrust bearing on said element and the other of said members having a threaded engagement with said element, a plurality of jaws pivoted on at least one of said members, and means limiting the pivotal movement of said jaws.

8. In a rim tool, a manipulating arm, opposed rim engaging jaw devices carried by said arm, at least one of said devices comprising independently movable jaws arranged to be spaced longitudinally of a rim to which the tool is applied, and means for forcing said opposed devices towards each other.

9. In a rim tool, a manipulating arm, opposed rim engaging jaw devices carried by said arm, each of which devices comprises a pair of independently movable jaws arranged to be spaced longitudinally of a rim to which the tool is applied, and means for drawing said devices towards each other.

10. In a rim tool, a manipulating arm, a screw element extending transversely of the arm, spaced blocks mounted on said element, one of which blocks is threaded on said element and the other of which blocks is rotatable thereon but held against longitudinal movement thereon, jaws freely pivoted on the opposite side of each of said blocks, each of said jaws including a tooth and a projection spaced from its tooth for engaging a rim at points spaced transversely of the rim.

11. In a rim tool, a pair of arms pivoted to each other near one end of each, three or more rim-engaging elements independently pivoted on the other end of each of said arms to swing transversely of the rim to which the tool is applied, certain of said elements being opposed to other of said elements on the same arm, a device for drawing said opposed elements toward each other, and means mounted on one of said arms but removable therefrom independently of said elements and said device and adapted to engage a rim on opposite sides of said joint to offset the rim ends radially of the rim.

In testimony whereof I hereunto affix my signature this 9th day of December, 1927.

FRANCIS H. WEBSTER.